US012254817B2

(12) United States Patent
Dai

(10) Patent No.: US 12,254,817 B2
(45) Date of Patent: Mar. 18, 2025

(54) DISPLAY PANEL, DISPLAY PANEL DRIVING METHOD AND DISPLAY APPARATUS

(71) Applicant: Wuhan Tianma Microelectronics Co., Ltd., Wuhan (CN)

(72) Inventor: Wenbin Dai, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 170 days.

(21) Appl. No.: 18/113,579

(22) Filed: Feb. 23, 2023

(65) Prior Publication Data

US 2024/0221610 A1 Jul. 4, 2024

(30) Foreign Application Priority Data

Jan. 3, 2023 (CN) ......................... 202310003072.0

(51) Int. Cl.
*G09G 3/32* (2016.01)

(52) U.S. Cl.
CPC ....... *G09G 3/32* (2013.01); *G09G 2300/0452* (2013.01); *G09G 2300/0819* (2013.01);
(Continued)

(58) Field of Classification Search
CPC ............. G09G 3/32; G09G 2300/0452; G09G 2300/0819; G09G 2300/0842;
(Continued)

(56) References Cited

U.S. PATENT DOCUMENTS

2016/0078836 A1* 3/2016 Kim ..................... G09G 3/3688 345/209
2017/0372662 A1* 12/2017 Zhang .................. G09G 3/3275
(Continued)

FOREIGN PATENT DOCUMENTS

CN 108986763 A 12/2018
CN 110178175 A 8/2019
(Continued)

OTHER PUBLICATIONS

The First Office Action for Chinese Application No. 202310003072.0, dated Mar. 12, 2024, 19 pages.

*Primary Examiner* — Chanh D Nguyen
*Assistant Examiner* — Gloryvid Figueroa-Gibson
(74) *Attorney, Agent, or Firm* — East IP P.C.

(57) ABSTRACT

The application includes a display panel, display panel driving method and display apparatus. The display panel includes a demultiplexing circuit, of which, an input end is connected to a data signal fan-out line, two output ends are respectively connected to two data signal lines, and two control ends are connected to a first and second strobe signal line respectively. In an $n^{th}$ line scanning stage, a first strobe signal is switched from a disable signal to an enable signal at a first time node, and a second strobe signal is switched from the enable signal to the disable signal at a second time node. In an $(n+1)^{th}$ line scanning stage, the first strobe signal is switched from the enable signal to the disable signal at a third time node, and the second strobe signal is switched from the disable signal to the enable signal at a fourth time node.

17 Claims, 7 Drawing Sheets

(52) U.S. Cl.
CPC ............... *G09G 2300/0842* (2013.01); *G09G 2310/0202* (2013.01); *G09G 2310/0297* (2013.01); *G09G 2310/08* (2013.01); *G09G 2330/021* (2013.01)

(58) Field of Classification Search
CPC ... G09G 2310/0202; G09G 2310/0297; G09G 2310/08; G09G 2330/021; G09G 3/3233; G09G 3/3208; G09G 3/3266; G09G 3/3291
USPC .......................................................... 345/691
See application file for complete search history.

(56) References Cited

U.S. PATENT DOCUMENTS

| | | | | |
|---|---|---|---|---|
| 2019/0088185 | A1 | 3/2019 | Zhang et al. | |
| 2020/0098299 | A1* | 3/2020 | Zeng | G09G 3/2003 |
| 2020/0365085 | A1* | 11/2020 | Yang | G09G 3/3258 |

FOREIGN PATENT DOCUMENTS

| | | | |
|---|---|---|---|
| CN | 110827765 | A | 2/2020 |
| CN | 111613183 | A | 9/2020 |
| CN | 111627393 | A | 9/2020 |
| CN | 114 7434 93 | A | 7/2022 |
| KR | 20160033289 | A | 3/2016 |

* cited by examiner

DISPLAY PANEL, DISPLAY PANEL DRIVING METHOD AND DISPLAY APPARATUS

CROSS-REFERENCE TO RELATED APPLICATIONS

The present application is based upon and claims priority to Chinese patent application No. 202310003072.0 filed on Jan. 3, 2023, the content of which is incorporated herein by reference in its entirety.

TECHNICAL FIELD

The present application belongs to the field of display technology, and particularly, relates to a display panel, a display panel driving method and a display apparatus.

BACKGROUND

Currently, a display panel generally includes a plurality of light-emitting pixels arranged in an array, and the light-emitting pixels are composed of pixel circuits and light-emitting elements. A pixel circuit usually consists of a Thin Film Transistor (TFT) and a capacitor. A light-emitting element usually may include an Organic Light-Emitting Diode (OLED) or another light-emitting device.

As resolution of a display panel increases, the total number of columns of light-emitting pixels increases and the number of data signal lines required increases. In the related art, in order to reduce the number of data signal fan-out lines connected to a driver chip, a multiplexing module is usually used to perform time division multiplexing on data signals, so as to reduce the number of data signal fan-out lines and the number of output terminals of the driver chip.

However, a strobe signal of a relatively high frequency is required, in order to control the multiplexing module to perform time division gating so as to realize time division multiplexing on data signals. During display of images, a high frequency transition of the strobe signal will result in a higher power consumption, and thereby the power consumption of the display panel stays at a high level.

SUMMARY

Embodiments of the present application provide a display panel, a display panel driving method and a display apparatus, which can solve the technical problem of a high power consumption when a multiplexing module is derived to perform time division multiplexing of data signals.

One aspect of the present application provides a display panel. The display panel includes: a plurality of light-emitting pixels arranged in an array; at least one demultiplexing circuit, for each of the at least one demultiplexing circuit, an input end being connected to a data signal fan-out line, and two output ends being respectively connected to two data signal lines; and a first strobe signal line for providing a first strobe signal and a second strobe signal line for providing a second strobe signal; wherein in an $n^{th}$ line scanning stage, the first strobe signal is switched from a disable signal to an enable signal at a first time node, and the second strobe signal is switched from the enable signal to the disable signal at a second time node; at the end of the $n^{th}$ line scanning stage, the first strobe signal and the second strobe signal remain unchanged; in an $(n+1)^{th}$ line scanning stage, the first strobe signal is switched from the enable signal to the disable signal at a third time node, and the second strobe signal is switched from the disable signal to the enable signal at a fourth time node; and a first control end and a second control end of each of the least one demultiplexing circuit are connected to the first strobe signal line and the second strobe signal line respectively.

Another aspect of the present application provides a display panel driving method, applicable to a display panel. The display panel includes a plurality of light-emitting pixels arranged in an array; at least one demultiplexing circuit, for each of the at least one demultiplexing circuit, an input end being connected to a data signal fan-out line, and two output ends being respectively connected to two data signal lines; and a first strobe signal line for providing a first strobe signal and a second strobe signal line for providing a second strobe signal, wherein a first control end and a second control end of each of the least one demultiplexing circuit are connected to the first strobe signal line and the second strobe signal line respectively. The method includes in an $n^{th}$ line scanning stage, switching the first strobe signal from a disable signal to an enable signal at a first time node, and switching the second strobe signal from the enable signal to the disable signal at a second time node; at the end of the $n^{th}$ line scanning stage, maintaining signal levels of the first strobe signal and the second strobe signal unchanged; and in an $(n+1)^{th}$ line scanning stage, switching the first strobe signal from the enable signal to the disable signal at a third time node, and switching the second strobe signal from the disable signal to the enable signal at a fourth time node.

Another aspect of the present application provides a display apparatus including the display panel according to the first aspect.

BRIEF DESCRIPTION OF THE DRAWINGS

In order to illustrate the technical solutions of the embodiments of the present application more clearly, a brief description of accompanying drawings that are to be used by the embodiments of the present application will be given below. Obviously, the drawings described below are only some embodiments of the present application, and for a person of ordinary skills in the art, other drawings can be obtained according to these drawings without any inventive effort.

In the drawings.

10, light-emitting pixel; 20, multiplexing module; MUX1, first strobe signal line; MUX2, second strobe signal line; Fa, data signal fan-out line; Src, data signal line.

DETAILED DESCRIPTION

Features and exemplary embodiments of various aspects of the present application will be described in details below. In order to make the objects, technical solutions and advantages of the present application clearer, the present application is further described in detail below with reference to the drawings and specific embodiments. It should be understood that the specific embodiments described herein are merely intended to explain the present application, rather than to limit the present application. For those skilled in the art, the present application can be implemented without some of these specific details. The following description of the embodiments is only for providing a better understanding of the present application by illustrating examples of the present application.

It should be noted that relational terms such as “first” and “second” are used herein only for distinguishing one entity or operation from another entity or operation, and do not necessarily require or imply any such actual relationship or order between these entities or operations. Moreover, the terms “comprising”, “including” or any other variation thereof are intended to encompass a non-exclusive inclusion, such that a process, a method, an article or a device including a series of elements not only includes these elements, but also includes other elements not explicitly listed or elements inherent to the process, the method, the article or the device. Without further limitation, an element preceded by “comprising . . . ” and “including . . . ” does not exclude the presence of additional similar elements in a process, a method, an article or a device including the element.

It should be noted that embodiments of the present application and features thereof can be combined with each other if no conflict. Hereinafter, the embodiments will be described in details with reference to the accompanying drawings.

Figure 1:
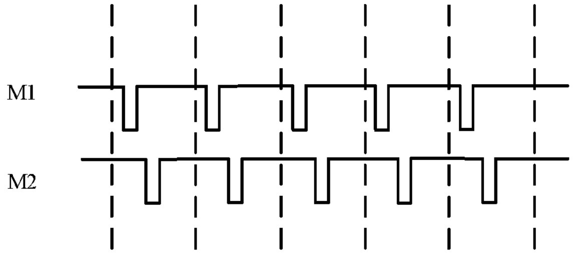
FIG. 1 is a signal timing diagram of strobe signals in the related art.

Reference is made to FIG. 1 that shows a schematic signal timing diagram of two strobe signals M1 and M2. In the related art, in a scanning stage corresponding to each row of light-emitting pixels, the two strobe signals should provide an effective pulse signal sequentially. That is, in a single scanning stage, each strobe signal needs to undergo one falling transition and one rising transition, i.e., a total of two signal transition processes. Thus, a signal period of the strobe signals constitutes a scanning stage. It will be appreciated that power consumed by a strobe signal has a positive correlation with a signal frequency of the strobe signal. In the same time period, the greater the number of signal transitions, the greater the power consumed by the strobe signals.

In order to solve the above-mentioned technical problem, embodiments of the present application provide a display panel, a display panel driving method and a display apparatus. Firstly, the display panel provided by an embodiment of the present application is described below.

Figure 2:
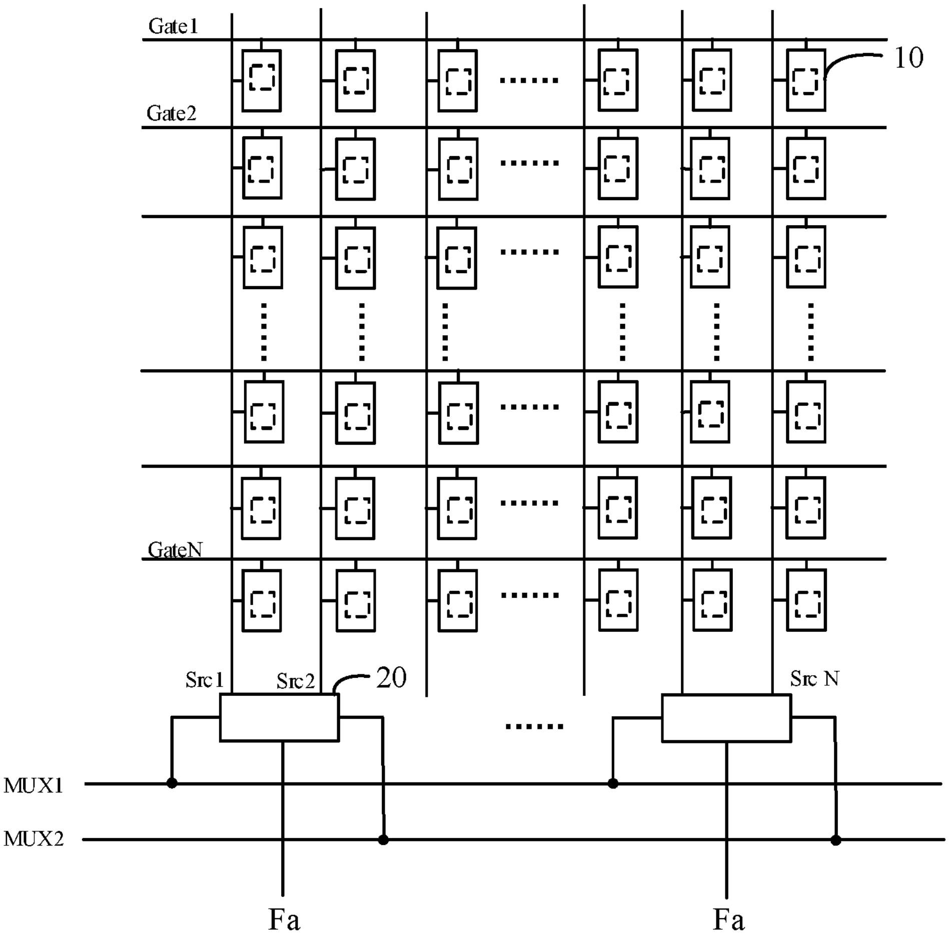
FIG. 2 is a schematic structure diagram of a display panel provided by an embodiment of the present application.

FIG. 2 shows a schematic structure diagram of the display panel provided by the embodiment of the present application. The display panel includes a plurality of light-emitting pixels 10, at least one demultiplexing circuit 20, a first strobe signal line MUX1 and a second strobe signal line MUX2.

The plurality of light-emitting pixels 10 may be arranged in an array in the display panel, to form a display area of the display panel.

The demultiplexing circuit 20 includes an input end and two output ends. The input end is connected to a data signal fan-out line Fa, and the two output ends are respectively connected to two data signal lines Src.

A data signal lines Src may extend within the display area of the display panel, and be electrically connected to the light-emitting pixels 10 in the same column to sequentially supply data signals to the light-emitting pixels 10 in the same column.

The demultiplexing circuit 20 may connect the input end to one of the two output ends. When the data signal fan-out line Fa provides a data signal, the demultiplexing circuit 20 connects the input end to one of the output ends, and may direct the data signal output by the data signal fan-out line Fa to the data signal line Src corresponding to the output end, so that the corresponding light-emitting pixels 10 on the data signal line Src can receive the data signal. One end of the data signal line Src is connected to the demultiplexing circuit 20, and the data signal line Src may extend in the display area, enabling the light-emitting pixels 10 in the same column to be electrically connected to the same data signal line Src.

The first strobe signal line MUX1 may provide a first strobe signal and the second strobe signal line MUX2 may provide a second strobe signal. A first control end of the demultiplexing circuit 20 is connected to the first strobe signal line MUX1, and a second control end of the demultiplexing circuit 20 is connected to the second strobe signal line MUX2.

When a first strobe signal provided by the first strobe signal line MUX1 is an enable signal, the first control end of the demultiplexing circuit 20 receives the enable signal, and can enable an output end corresponding to the first control end to connect to the input end. For example, the output ends may include a first output end and a second output end, the first control end may control whether the input end connects to the first output end or not, and the second control end may control whether the input end connects to the second output end or not. When the first control end receives the enable signal, the input end of the demultiplexing circuit 20 connects to the first output end.

Similarly, when the second strobe signal provided by the second strobe signal line MUX2 is an enable signal, the second control end of the demultiplexing circuit 20 receives the enable signal, and can enable the second output end corresponding to the second control end to connect to the input end.

In an image frame, each row of light-emitting pixels 10 may receive a scanning signal by line. Thus, a single image frame may include multiple line scanning stages. In a single line scanning stage, one of multiple rows of light-emitting pixels 10 can receive the enable signal of the scanning signal and access the data signal for charging.

In the following, any two adjacent line scanning stages during a light-emitting process of the display panel may be taken as an example. The two adjacent line scanning stages may be an $n^{th}$ line scanning stage and an $(n+1)^{th}$ line scanning stage, where n may be a positive integer. It will be appreciated that the two adjacent line scanning stages may correspond to two adjacent rows of light-emitting pixels 10. For example, the $n^{th}$ line scanning stage corresponds to an $n^{th}$ row of pixels, and the $n^{th}$ row of pixels may receive the enable signal of the scanning signal in the $n^{th}$ line scanning stage. Similarly, the $(n+1)^{th}$ line scanning stage corresponds to the $(n+1)^{th}$ row of pixels, and the $(n+1)^{th}$ row of pixels may receive the enable signal of the scanning signal in the $(n+1)^{th}$ line scanning stage.

In the $n^{th}$ line scanning stage, a light-emitting pixel 10 of the $n^{th}$ row of pixels, when receiving the enable signal of the scanning signal, directs a data signal into a pixel circuit of the light-emitting pixel 10 for charging; and in the $(n+1)^{th}$ line scanning stage, a light-emitting pixel 10 of the $(n+1)^{th}$ row of pixels, when receiving the enable signal of the scanning signal, directs a data signal into a pixel circuit of the light-emitting pixel 10 for charging.

Figure 3:
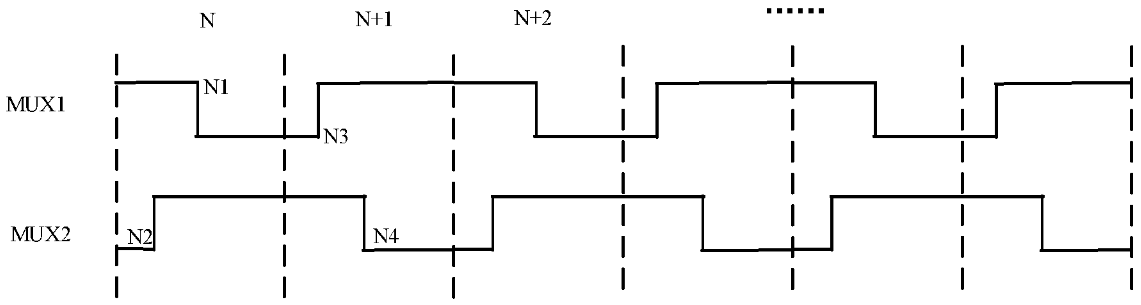
FIG. 3 is a signal timing diagram of a strobe signal provided by an embodiment of the present application.

As shown in FIG. 3, a disable signal of a strobe signal may be a high-level signal and an enable signal of the strobe signal may be a low-level signal. In the $n^{th}$ line scanning stage, the first strobe signal may be switched from the disable signal to the enable signal at a first time node N1, and the second strobe signal may be switched from the enable signal to the disable signal at a second time node N2.

The first strobe signal is the disable signal before the first time node N1 in the $n^{th}$ line scanning stage. At this moment, the first control end of the demultiplexing circuit 20 receives the disable signal, a first output end corresponding to the first control end of the demultiplexing circuit 20 is disconnected from the input end. The first strobe signal is the enable signal after the first time node N1. At this moment, the first control end can control the first output end to connect to the input end. That is, the data signal line Src to which the first output end is connected can receive the data signal supplied from the data signal fan-out line Fa during the first time node N1 to a stage end node in the $n^{th}$ line scanning stage.

Accordingly, the second strobe signal is the enable signal before the second time node N2 in the $n^{th}$ line scanning stage, and is switched to the disable signal after the second time node N2. Therefore, before the second time node N2, the second control end can control the second output end to connect to the input end; and after the second time node N2, the second control end may control the second output end to disconnect from the input end. That is, the data signal line Src to which the second output end is connected can receive the data signal supplied from the data signal fan-out line Fa during a stage start end to second time node N2 in the $n^{th}$ line scanning stage.

In the $n^{th}$ line scanning stage, one of the two data signal lines Src may obtain a data signal during the stage start node to the second time node N2, and the other one may obtain a data signal during the first time node N1 to the stage end node.

In the $n^{th}$ line scanning stage, one of multiple rows of light-emitting pixels 10 can receive the enable signal of the scanning signal. With regard to the two columns of light-emitting pixels 10 connected to the demultiplexing circuit 20, the two columns of light-emitting pixels 10 include two light-emitting pixels 10 located in the same row. The two light-emitting pixels 10 can receive the enable signal of the scanning signal, and connect to corresponding two data signal lines Src to respectively receive data voltages on the two data signal lines Src for charging.

The signal voltage of the data signal provided by the data signal fan-out line Fa in the $n^{th}$ line scanning stage can be adjusted, so that the two data signal lines Src, when separately connected to the data signal fan-out line Fa, receive data signals of different signal voltages. The two data signal lines then provide different data signals to two light-emitting pixels 10 in the same row, so that the two light-emitting pixels 10 can achieve different display brightnesses. As such, separate control of light emitting of the two light-emitting pixels 10 can be achieved.

At the end node of the $n^{th}$ line scanning stage, the first strobe signal and the second strobe signal remain unchanged, i.e. the first strobe signal remains the enable signal and the second strobe signal remains the disable signal.

As shown in FIG. 3, in the $(n+1)^{th}$ line scanning phase, the first strobe signal may be switched from the enable signal to the disable signal at a third time node N3, and the second strobe signal may be switched from the disable signal to the enable signal at a fourth time node N4.

The first strobe signal is the enable signal before the third time node N3 in the $(n+1)^{th}$ line scanning stage. At this moment, the first control end may control the first output end to connect to the input end. After the third time node N3, the first control end receives the disable signal, and disconnect the first output end from the input end. That is, the data signal line Src to which the first output end is connected can receive the data signal supplied from the data signal fan-out line Fa during a stage start node to the first time node N3 in the $(n+1)^{th}$ line scanning stage.

Accordingly, the second strobe signal is the disable signal before the fourth time node N4 in the $(n+1)^{th}$ line scanning stage, and is switched to the enable signal after the fourth time node N4. Therefore, before the fourth time node N4, the second control end can control the second output end to disconnect from the input end; and after the fourth time node N4, the second control end may control the second output end to connect to the input end. That is, the data signal line Src to which the second output end is connected can receive the data signal supplied from the data signal fan-out line Fa during the fourth time node N4 to a stage end node in the $(n+1)^{th}$ line scanning stage.

In the $(n+1)^{th}$ line scanning stage, one of the two data signal lines Src may obtain a data signal during the stage start node to the third time node N3, and the other one may obtain a data signal during the fourth time node N4 to the stage end node.

In the two columns of light-emitting pixels 10 connected to the demultiplexing circuit 20, a row of two light-emitting pixels 10 can receive the enable signal of the scanning signal in the $n^{th}$ line scanning stage, and access data voltages on the two data signal lines Src respectively for charging, according to the enable signal of the scanning signal; and a next row of two light-emitting pixels 10 can receive the enable signal of the scanning signal in the $(n+1)^{th}$ line scanning stage, and access data voltages on the two data signal lines Src respectively for charging, according to the enable signal of the scanning signal.

Likewise, the signal voltage of the data signal provided by the data signal fan-out line Fa in the $(n+1)^{th}$ line scanning stage can be adjusted, so that the two data signal lines Src, when separately connected to the data signal fan-out line Fa, receive data signals of different signal voltages. The two data signal lines then provide different data signals to two light-emitting pixels 10 in the same row, so that the two light-emitting pixels 10 can achieve different display brightnesses. As such, separate control of light emitting of the two light-emitting pixels 10 can be achieved.

It can be seen from the above analysis that two adjacent line scanning stages may be the $n^{th}$ line scanning stage and the $(n+1)^{th}$ line scanning stage, and in the $n^{th}$ line scanning stage, the demultiplexing circuit 20 can respectively connect the two data signal lines Src to the data signal fan-out line Fa in different time periods. The signal voltage of the data signal output by the data signal fan-out line Fa when connected to each of the two data signal lines Src can be adjusted, so that the two light-emitting pixels 10 of the $n^{th}$ row can receive different data signals.

Further, in the $(n+1)^{th}$ line scanning stage, the signal voltage of the data signal output by the data signal fan-out line Fa when connected to each of the two data signal lines Src can be adjusted continuously, so that the two light-emitting pixels 10 of the $(n+1)^{th}$ row also receive different data signals. That is, one data signal fan-out line Fa can sequentially provide different data signals to two light-emitting pixels 10 of each row respectively in each line scanning stage, and thereby time division multiplexing of the data signal fan-out line Fa can be realized.

At the end of the $(n+1)^{th}$ line scanning stage, the first strobe signal and the second strobe signal may also remain unchanged, that is, the first strobe signal remains the disable signal and the second strobe signal remains the enable signal.

As shown in FIG. 3, in the next line scanning stage after the $(n+1)^{th}$ line scanning stage, i.e. the $(n+2)^{th}$ line scanning stage, similarly to the $n^{th}$ line scanning stage, the first strobe signal may become the enable signal at a certain time node and the second strobe signal may become the disable signal at a certain time node. At this moment, two light-emitting pixels 10 of the $(n+2)^{th}$ row can receive different data signals in the enable signal periods of the first strobe signal and the second strobe signal, respectively. That is, in each line scanning stage, in the two columns of light-emitting pixels 10 connected to the demultiplexing circuit 20, there are two light-emitting pixels 10 capable of receiving the enable signal of the scanning signal, and the two light-emitting pixels 10 can connect to corresponding data signal lines Src and receive data signals of different signal voltages.

It can be seen from the conversion mode of the first strobe signal and the second strobe signal in each line scanning stage that, in each line scanning stage, the first strobe signal and the second strobe signal both undergo only one transition, and the transition can be a transition from an enable signal to a disable signal or a transition from a disable signal to an enable signal. For example, the first strobe signal is taken as an example. In the $n^{th}$ line scanning stage, the first strobe signal simply transition from the disable signal to the enable signal, and in the $(n+1)^{th}$ line scanning stage, the first strobe signal simply transition from the enable signal to the disable signal. It can also be derived from the signal timing diagram of the first strobe signal line MUX1 in FIG. 3 that the signal period of the first strobe signal is two line scanning stages.

In the related art, when strobe signals are used to drive a demultiplexing circuit 20 to perform time division multiplexing of data signals, as shown in FIG. 1, in each line scanning stage, one rising transition and one falling transition are required for both strobe signals, i.e., both strobe signals need to undergo two signal transitions. Thus, the signal period of the strobe signals is a single line scanning stage. However, in the embodiment of the present application, only a single signal transition is required for the two strobe signals in each line scanning stage. That is, in the embodiment of the present application, the signal period of the two strobe signals is twice longer than the signal period of the original strobe signals, and the signal frequency is twice lower than the original signal frequency.

The power consumption of the strobe signal can be calculated using the following equation:

$$P=(c*\delta V)^{\wedge}2*f$$

where c is a load capacitance, δV is a high-low level difference of signal transition, and f is a signal frequency; that is, the power consumption of the strobe signal has a positive correlation with the signal frequency.

In the above embodiments, only one signal transition is required for each of the strobe signals in a single line scanning stage, so that the signal period of the strobe signal is increased and the signal frequency of the strobe signal is decreased. As the signal frequency decreases, the power consumed by the display panel to provide the strobe signal also decreases. That is, when the demultiplexing circuit 20 is driven to perform time division multiplexing of data signals, the power consumption of the strobe signal can be reduced, and thereby the overall power consumption of the display panel can be reduced.

In the embodiment, the demultiplexing circuit can be driven with the first strobe signal and second strobe signal to connect the data signal fan-out line Fa to each of the two data signal lines Src, by setting two strobe signal lines to respectively connect to the control end of the demultiplexing circuit 20, so that corresponding data signals can be received by corresponding light-emitting pixels 10 on the two data signal lines Src in each line scanning stage. The data signal fan-out line Fa outputs different data voltages in different time periods, so that the two data signal lines Src receive different data voltages respectively, enabling two light-emitting pixels 10 to display at different light-emitting brightnesses respectively, and achieving time division multiplexing of the data signal fan-out line Fa. Both strobe signals undergo only a single signal transition process in each line scanning stage, so that the signal period of the strobe signals is increased. By increasing the signal period of the strobe signals and reducing the signal frequency of the strobe signals, the signal power of the strobe signals can be reduced, so that the driving power consumption of the demultiplexing circuit 20 is reduced when the demultiplexing circuit 20 is used to achieve time division multiplexing of data signals, and further the overall power consumption of the display panel when displaying is reduced.

It should be noted that, in an alternative embodiment, the display panel may include a plurality of demultiplexing circuits 20, and a corresponding number of demultiplexing circuits 20 may be provided depending on the number of columns of light-emitting pixels 10. Each of the demultiplexing circuits 20 is connected to two data signal lines Src, and data signals of the two data signal lines Src can be output utilizing a single data signal fan-out line Fa. By providing a plurality of demultiplexing circuits 20, the number of data signal fan-out lines Fa and the number of corresponding output terminals in a driver chip can be greatly reduced.

As shown in FIG. 3, in some embodiments, the first time node N1 does not coincide with the second time node N2, and the third time node N3 does not coincide with the fourth time node N4.

The $n^{th}$ line scanning stage is taken as an example. In order to control light-emitting of two light-emitting pixels 10 separately, it is necessary to enable the light-emitting pixels 10 corresponding respectively to two data lines to receive data signals of different signal voltages. If the first time node N1 coincide with the second time node N2, both output ends of the demultiplexing circuit 20 are connected to the input end at the coincident time nodes, and thereby, the two data signal lines Src are electrically connected. At this moment, the signal voltages on the two data signal lines Src will change, and the signal voltages received by the light-emitting pixels 10 are different from the signal voltages required for performing light-emitting control, resulting in a deviation in the actual light-emitting brightnesses of the light-emitting pixels 10. Therefore, in the $n^{th}$ line scanning stage, the first time node N1 at which the first strobe signal transitions should not coincide with the second time node N2 at which the second strobe signal transitions.

Likewise, in the $(n+1)^{th}$ line scanning stage, the third time node N3 and the fourth time node N4 should be set to not coincide with each other.

As further shown in FIG. 3, in some embodiments, in the $n^{th}$ line scanning stage, the second time node N2 may be set before the first time node N1. In the $(n+1)^{th}$ line scanning stage, the third time node N3 may be set before the fourth time node N4.

In the $n^{th}$ line scanning stage, one of multiple rows of light-emitting pixels 10 can receive the enable signal of the scanning signal. With regard to the two columns of light-emitting pixels 10 connected to the demultiplexing circuit 20, two light-emitting pixels 10 in the two columns of light-emitting pixels 10 that are located in the same row and can receive the enable signal of the scanning signal can respectively receive data voltages on the two data signal lines Src for charging.

The signal voltage of the data signal provided by the data signal fan-out line Fa in the $n^{th}$ line scanning stage can be adjusted, so that the two data signal lines Src receive data signals of different signal voltages. As such, separate control of light emitting of the two light-emitting pixels 10 can be achieved.

In order to enable a difference in the signal voltages of the data signals received by the two data signal lines Src, the time periods during which the data signals are received by the two data signal lines Src should not coincide with each other. Since one of the data signal lines Src can obtain a data signal during a time interval from the stage start node to the second time node N2 and the other one can obtain a data signal during a time interval from the first time node N1 to the stage end node, the second time node N2 can be set before the first time node N1 in order to avoid an time period during which both the two data signal lines Src can receive data signals. As shown in FIG. 3, in the time interval between the second time node N2 and the first time node N1, the first strobe signal and the second strobe signal are both disable signals, and at this moment, both output ends of the demultiplexing circuit 20 are disconnected from the input end.

Similarly, in the $(n+1)^{th}$ line scanning stage, one of the two data signal lines Src can obtain a data signal during a time interval from the stage start node to the third time node N3, and the other one can obtain a data signal during a time interval from the fourth time node N4 to the stage end node. The third time node N3 may be set before the fourth time node N4, in order to avoid an time period during which both the two data signal lines Src can receive data signals. At this moment, in the time interval between the third time node N3 and the fourth time node N4, the first strobe signal and the second strobe signal are both disable signals, and both output ends of the demultiplexing circuit 20 are disconnected from the input end.

Figure 4:
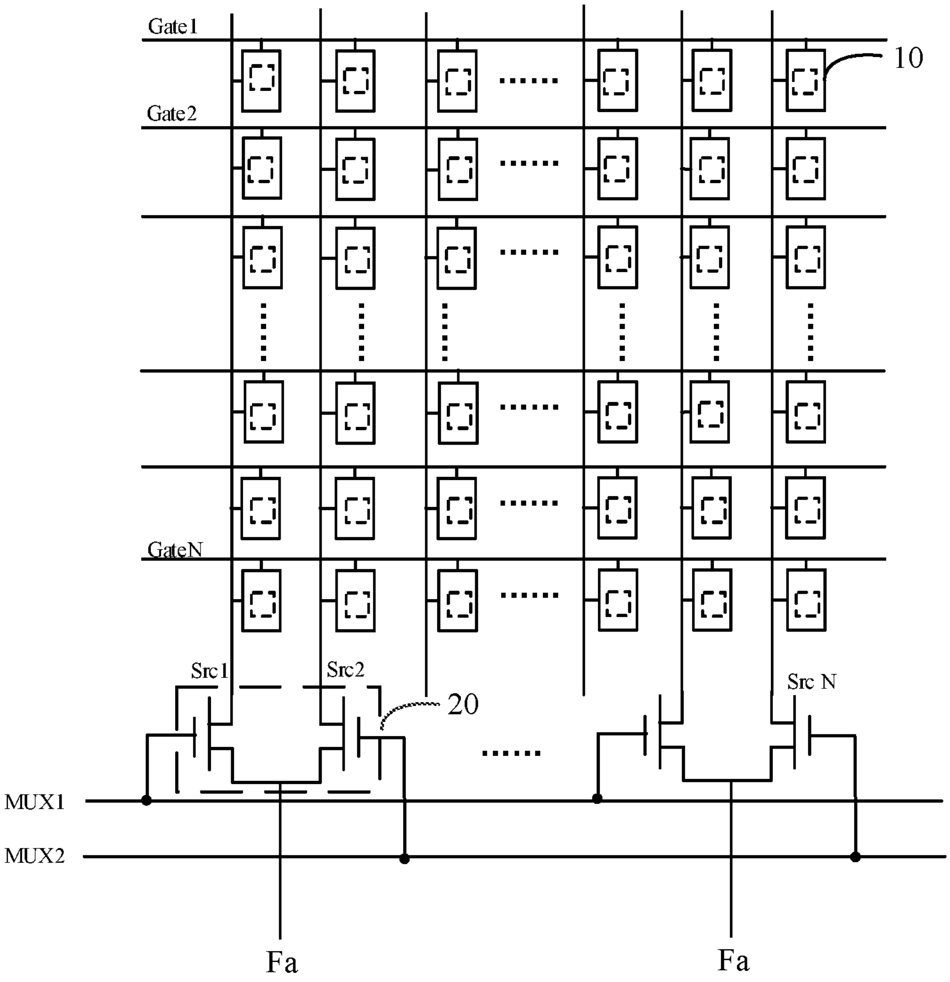
FIG. 4 is a schematic structure diagram of a display panel provided by another embodiment of the present application.

As an alternative implementation, as shown in FIG. 4, the above-mentioned demultiplexing circuit 20 may include two switch tubes. First ends of the two switch tubes are both connected to a data signal fan-out line Fa, control ends of the two switch tubes are respectively connected to a first strobe signal line MUX1 and a second strobe signal line MUX2, and second ends of the two switch tubes are respectively connected to two data signal lines Src. When a first strobe signal output by the first strobe signal line MUX1 is an enable signal, one of the switch tubes is turned on, to connect the data signal fan-out line Fa to one of the data signal lines Src; when a second strobe signal output from the second strobe signal line MUX2 is the enable signal, the other switch tube is turned on, to connect the data signal fan-out line Fa to the other data signal line Src.

As further shown in FIG. 2, in some embodiments, the above-mentioned display panel may further include at least one data signal fan-out line Fa.

One end of the data signal fan-out line Fa may be electrically connected to the input end of the demultiplexing circuit 20, and the other end may be connected to an output terminal of a driver chip. The driver chip may output a corresponding data signal through the output terminal and provide the data signal to the corresponding data signal line Src through the data signal fan-out line Fa and the demultiplexing circuit 20.

Figure 5:
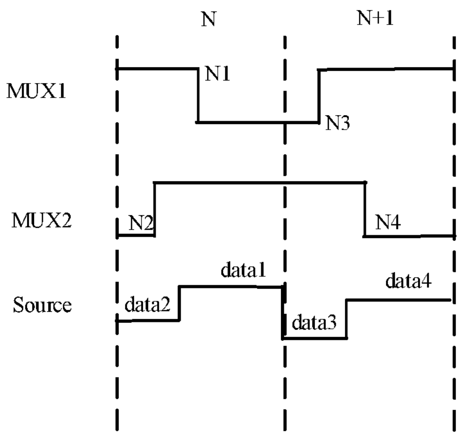
FIG. 5 is a signal timing diagram of a strobe signal provided by another embodiment of the present application.

As shown in FIG. 5, in the $n^{th}$ line scanning stage, the data signal fan-out line Fa may output a first data voltage data1 in a first data signal stage and output a second data voltage data2 in a second data signal stage. There is at least an overlapping time period between the first data signal stage and the enable signal period of the first strobe signal, and there is at least an overlapping time period between the second data signal stage the enable signal period of the second strobe signal.

Figure 6:
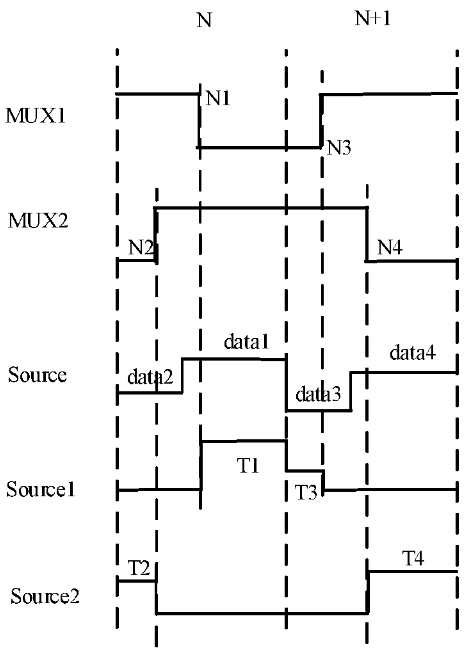
FIG. 6 is a signal timing diagram of a strobe signal provided by another embodiment of the present application.

As shown in FIG. 6, the Source signal is the data signal output by the data signal fan-out line Fa, the Source1 signal is the data signal received by one of the two data signal lines Src, and the Source2 signal is the data signal received by the other of the two data signal lines Src.

In the first data signal stage, the data signal fan-out line Fa can output the first data voltage data1, and in order to enable the data signal line Src to which the first output end of the demultiplexing circuit 20 is connected to receive the first data voltage data1, it is required to connect the input end of the demultiplexing circuit 20 to the first output end during a part of the first data signal stage. That is, the first data signal stage should at least overlap partially the enable signal an overlapping time period of the first strobe signal. As shown in FIG. 6, a time period T1 is an overlapping time period between the first data signal stage and the enable signal period of the first strobe signal. In the overlapping time period, the input end of the demultiplexing circuit 20 is connected to the first output end, and the first data voltage data1 on the data signal fan-out line Fa is output to the data signal line Src connected to the first output end of the demultiplexing circuit 20.

In the second data signal stage, in order to enable the data signal line Src to which the second output end of the demultiplexing circuit 20 is connected to receive the second data voltage data2, it is required to connect the input end of the demultiplexing circuit 20 to the second output end during a part of the second data signal stage. That is, the second data signal stage should at least overlap partially the enable signal period of the second strobe signal. As shown in FIG. 6, a time period T2 is an overlapping time period between the second data signal stage and the enable signal period of the second strobe signal. In the overlapping time period, the input end of the demultiplexing circuit 20 is connected to the second output end, and the second data voltage data2 on the data signal fan-out line Fa is output to the data signal line Src connected to the second output end of the demultiplexing circuit 20.

Similarly, in the $(n+1)^{th}$ line scanning stage, the data signal fan-out line Fa may output a third data voltage data3 in a third data signal stage and out a fourth data voltage data4 in a fourth data signal stage. The third data signal stage at least overlaps partially the enable signal period of the first strobe signal, and the fourth data signal stage at least overlaps partially the enable signal period of the second strobe signal.

As shown in FIG. 6, a time period T3 is an overlapping time period between the third data signal stage and the enable signal period of the first strobe signal, and a time period T4 is an overlapping time period between the fourth data signal stage and the enable signal period of the second strobe signal.

In the time period T3, the third data voltage data3 on the data signal fan-out line Fa is output to the data signal line Src connected to the first output end of the demultiplexing circuit 20.

In the time period T4, the fourth data voltage data4 on the data signal fan-out line Fa is output to the data signal line Src connected to the second output end of the demultiplexing circuit 20.

As further shown in FIG. 6, in some embodiments, in the $n^{th}$ line scanning stage as mentioned above, the data signal fan-out line Fa may adjust the second data voltage data2 to the first data voltage data1 between the second time node N2 and the first time node N1. That is, a voltage transition node of the data voltages may be between the second time node N2 and the first time node N1.

In the $(n+1)^{th}$ line scanning stage, the data signal fan-out line Fa can adjust the third data voltage data3 to the fourth data voltage data4 between the third time node N3 and the fourth time node N4.

In the $n^{th}$ line scanning stage, the first strobe signal and the second strobe signal are both disable signals between the second time node N2 and the first time node N1, and thus both output ends of the demultiplexing circuit 20 are disconnected from the input end. During this time interval, when the data voltage on the data signal fan-out line Fa is adjusted from the second data voltage data2 to the first data voltage data1, the two data signal lines Src are not affected. When the first strobe signal becomes the enable signal at the first time node N1, the data voltage on the data signal fan-out line Fa has become the first data voltage data1 already, and thereby the data signal line Src connected to the first output end of the demultiplexing circuit 20 can receive the first data voltage data1 directly.

Similarly, in the $(n+1)^{th}$ line scanning stage, the first strobe signal and the second strobe signal are both disable signals between the third time node N3 and the fourth time node N4, and thus both output ends of the demultiplexing circuit 20 are disconnected from the input end. During this time interval, when the data voltage on the data signal fan-out line Fa is adjusted from the third data voltage data3 to the fourth data voltage data4, the two data signal lines Src are not affected.

As further shown in FIG. 2, in some embodiments, the above-mentioned display panel may further include a plurality of scanning signal lines. Each of the scanning signal lines may be electrically connected to and provide scanning signals to light-emitting pixels 10 of a same row.

Figure 7:
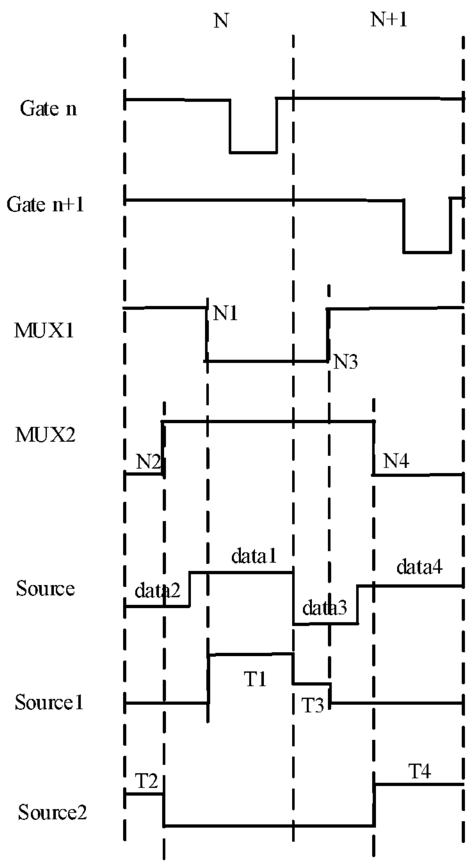
FIG. 7 is a signal timing diagram of a strobe signal provided by another embodiment of the present application.

In the $n^{th}$ line scanning stage, a scanning signal line Gate n corresponding to the line scanning stage may output the enable signal of the scanning signal in a first scanning period of the line scanning stage. As shown in FIG. 7, the enable signal of the scanning signal may be a low level signal, and a start time node of the first scanning period may be after the first time node N1.

Figure 8:
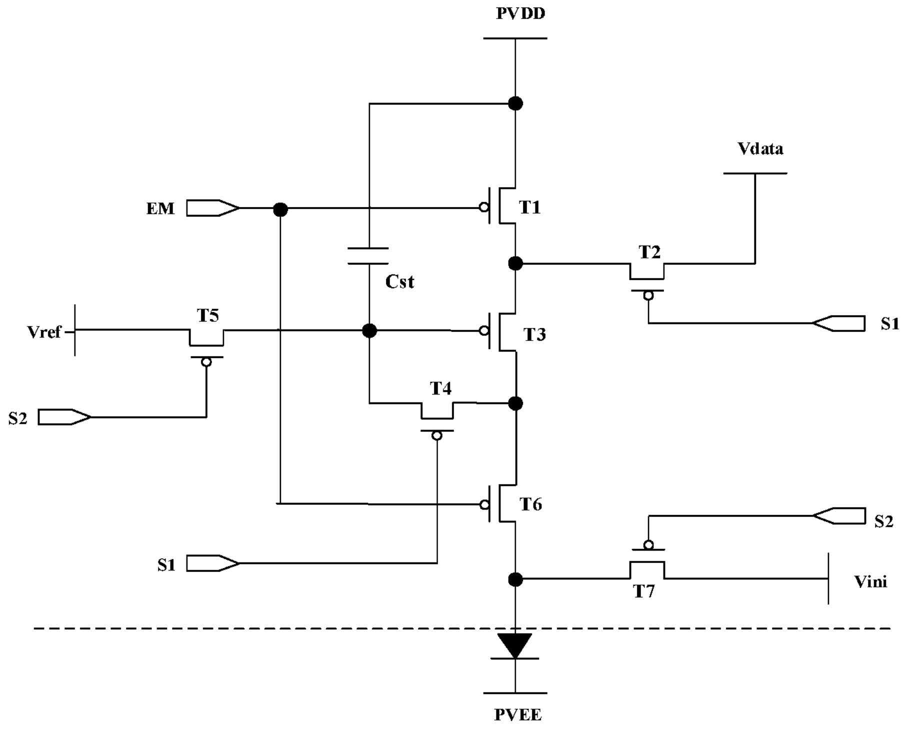
FIG. 8 is a schematic structure diagram of a circuit of a light-emitting pixel provided by an embodiment of the present application.

As shown in FIG. 8, a light-emitting pixel 10 may include a pixel circuit and a light-emitting element connected to the pixel circuit. The pixel circuit may include a plurality of transistors. As shown in FIG. 8, the pixel circuit may be composed of a first light-emitting control transistor T1, a data-writing transistor T2, a driving transistor T3, a threshold compensation transistor T4, a first initialization transistor T5, a second light-emitting control transistor T6, a second initialization transistor T7, and a storage capacitor Cst. In addition, the pixel circuit may be another drive circuit capable of controlling light emitting of the light-emitting element, which is not limited herein.

The 7T1C pixel circuit as mentioned above is taken as an example. A single light-emitting frame may include a non-light-emitting stage and a light-emitting stage. The non-light-emitting stage may include an initialization stage and a data-writing stage. In the data-writing stage, the pixel circuit can receive the data signal and be charged, and keep the driving transistor T3 on by discharging during the light-emitting stage, so that both ends of the light-emitting element can emit light when the light-emitting element is driven by a power signal.

When the scanning signal line Gate n outputs an enable signal of the scanning signal in the first scanning period, the enable signal is the SI signal received by the data-writing transistor T2 and the threshold compensation transistor T4 in FIG. 8. In the light-emitting pixels 10 of the same row which receive the enable signal of the scanning signal, the data-writing transistor T2 and the threshold compensation transistor T4 in the pixel circuit of each of the light-emitting pixels 10 can be turned on based on the enable signal of the scanning signal, to direct a data signal on the data signal line Src into the drive transistor T3 and the storage capacitor Cst, so as to charge the pixel circuit with the data signal.

With reference to FIG. 7 and FIG. 8 together, the first time node N1 is a time node when the first strobe signal is switched to the enable signal, and after the first time node N1, the demultiplexing circuit 20 may connect the data signal line Src connected at the first output end to the data signal fan-out line Fa, so that the data signal line Src receives the corresponding first data voltage data1. If the start time node of the first scanning period is set to be before the first time node N1, when the data-writing transistor and the threshold compensation transistor in the pixel circuit receive the enable signal of the scanning signal and turn on, the data signal line Src has not been connected to the data signal fan-out line Fa, and at this moment, the data signal line Src has not received the first data voltage data1, and thus cannot charge the pixel circuit. Therefore, the start time node of the first scanning period should be after the time when the data signal line Src receives the first data voltage data1, i.e. the start time node of the first scanning period is after the first time node N1.

In the $(n+1)^{th}$ line scanning stage, a scanning signal line Gate n+1 corresponding to the line scanning stage may output an enable signal of a scanning signal in a second scanning period in the line scanning stage, and a start time node of the second scanning period may be after the fourth time node N4.

Similarly, the fourth time node N4 is a time node at which the second strobe signal is switched to the enable signal. If the start time node of the second scanning period is set to be before the fourth time node N4, when the data-writing transistor and the threshold compensation transistor in the pixel circuit receive the enable signal of the scanning signal and turn on, the data signal line Src has not been connected to the data signal fan-out line Fa, and at this moment, the data signal line Src has not received the fourth data voltage data4, and thus cannot charge the pixel circuit. Therefore, the start time node of the second scanning period should be after the time when the data signal line Src receives the fourth data voltage data4, i.e. the start time node of the second scanning period is after the fourth time node N4.

In some embodiments, the plurality of light-emitting pixels 10 may include a first light-emitting pixel, a second light-emitting pixel, and a third light-emitting pixel emitting lights of different colors.

A single demultiplexing circuit 20 is taken as an example. Two data signal lines Src connected to the demultiplexing circuit 20 are used for providing data signals to two columns of light-emitting pixels 10 respectively. In the two columns of light-emitting pixels 10 corresponding to the demultiplexing circuit 20, any two light-emitting pixels adjacent in a up-down direction of at least one column of light-emitting pixels 10 emit lights of different colors.

In the array arrangement of a plurality of light-emitting pixels 10, with regard to light-emitting pixels 10 in the same column, two light-emitting pixels adjacent in a up-down direction may be set to emit lights of different colors. For example, when a light-emitting pixel 10 at a certain position in the same column is a first light-emitting pixel, neither the upper nor lower light-emitting pixel 10 adjacent to the light-emitting pixel 10 is the first light-emitting pixel.

In some embodiments, the two data signal lines Src to which the demultiplexing circuit 20 is connected are a first data signal line and a second data signal line, respectively. The first data signal line is connected to a first output end of the demultiplexing circuit 20, and the second data signal line is connected to a second output end of the demultiplexing circuit 20.

Each of the first data signal line and the second data signal line is electrically connected to a column of light-emitting pixels 10. Light-emitting pixels 10 in the same column connected to the first data signal line may include light-emitting pixels 10 that emit lights of two colors, for example, first light-emitting pixels and second light-emitting pixels, while light-emitting pixels 10 in the same column connected to the second data signal line may include light-emitting pixels 10 that emit lights of a remaining color, for example, third light-emitting pixels.

One of the two columns of light-emitting pixels 10 corresponding to the demultiplexing circuit 20 may be a column of light-emitting pixels 10 formed by alternately arranging the first light-emitting pixel and the second light-emitting pixel, and the other column may be formed by arranging the third light-emitting pixel.

Figure 9:
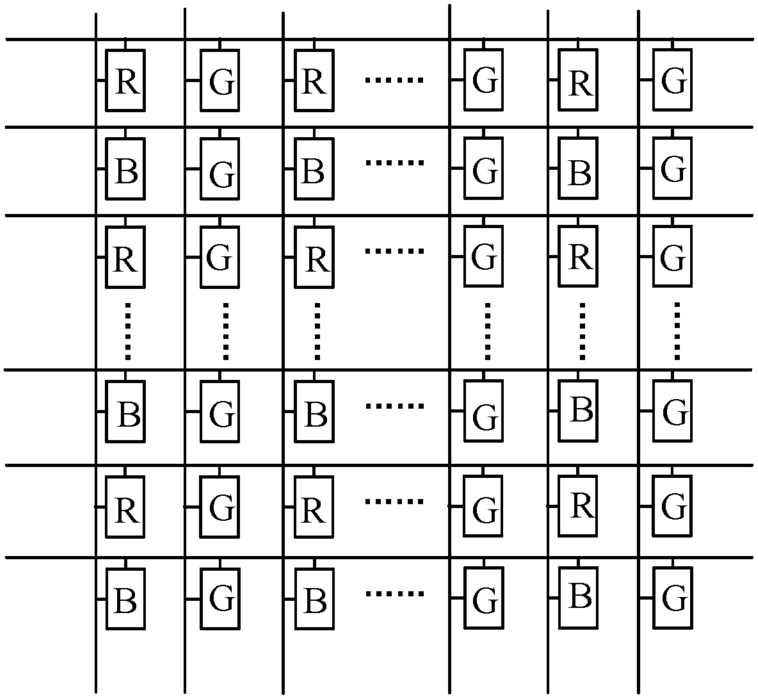
FIG. 9 is a schematic diagram showing a layout of light-emitting pixels provided by an embodiment of the present application.

As an alternative implementation, the above-mentioned light-emitting pixels 10 may be arranged as shown in FIG. 9. The first light-emitting pixel is a red light-emitting pixel R, the second light-emitting pixel is a blue light-emitting pixel B, and the third light-emitting pixel is a green light-emitting pixel G.

In some embodiments, the two data signal lines Src to which the demultiplexing circuit 20 is connected are a first data signal line and a second data signal line, respectively. The first data signal line is connected to a first output end of the demultiplexing circuit 20, and the second data signal line is connected to a second output end of the demultiplexing circuit 20.

The light-emitting pixels 10 of the same column connected to the first data signal line may include light-emitting pixels 10 emitting lights of two colors, for example, first light-emitting pixels and third light-emitting pixels, while the light-emitting pixels 10 of the same column connected to the second data signal line may include light-emitting pixels 10 emitting lights of two colors, for example, second light-emitting pixels and third light-emitting pixels.

Figure 10:
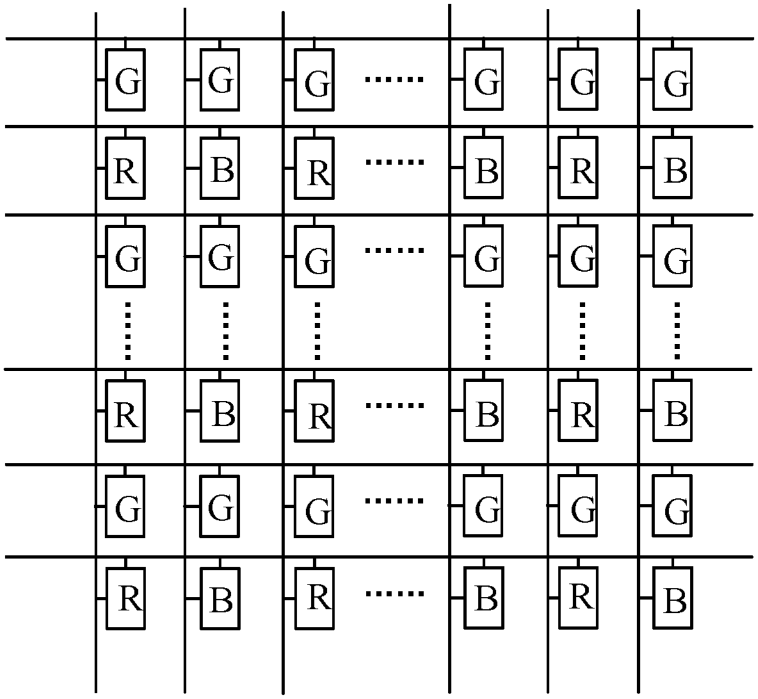
FIG. 10 is a schematic diagram showing a layout of light-emitting pixels provided by another embodiment of the present application.

As an alternative implementation, the above-mentioned light-emitting pixels 10 may be arranged as shown in FIG. 10. The first light-emitting pixel is a red light-emitting pixel R, the second light-emitting pixel is a blue light-emitting pixel B, and the third light-emitting pixel is a green light-emitting pixel G.

In some embodiments, the first light-emitting pixel, the second light-emitting pixel, and the third light-emitting pixel may emit red, blue, and green lights, respectively.

In other implementations, the display panel may further include light-emitting pixels 10 emitting lights of three or more colors, for example, may include light-emitting pixels 10 emitting lights of four colors: red, blue, green and white, or may include light-emitting pixels 10 emitting lights of four colors: red, blue, green and yellow.

When the light-emitting pixels 10 of the display panel emit lights of three or more colors, any two adjacent light-emitting pixels 10 in at least one column of two columns of light-emitting pixels 10 corresponding to the demultiplexing circuit 20 may be set to emit lights of different colors, so that light-emitting pixels 10 emitting lights of different colors are arranged alternately.

In some embodiments, the display panel may include a display area, which may include a plurality of light-emitting pixels 10, and a non-display area, which may include at least one demultiplexing circuit 20.

Once one demultiplexing circuit 20 is provided in the non-display area, data signals can be supplied to two data signal lines Src through one data signal fan-out line Fa, so as to save one data signal output terminal. If a plurality of demultiplexing circuits 20 are provided according to the array arrangement mode of light-emitting pixels 10 in the display area, and every two data signal lines Src are connected to one of the demultiplexing circuits 20, the number of required data signal fan-out lines Fa can be reduced to one half of the number of data signal lines Src. That is, the driver chip may supply each of the data signal lines Src with a data signal through output terminals which are in half the number of the data signal lines Src.

Figure 11:
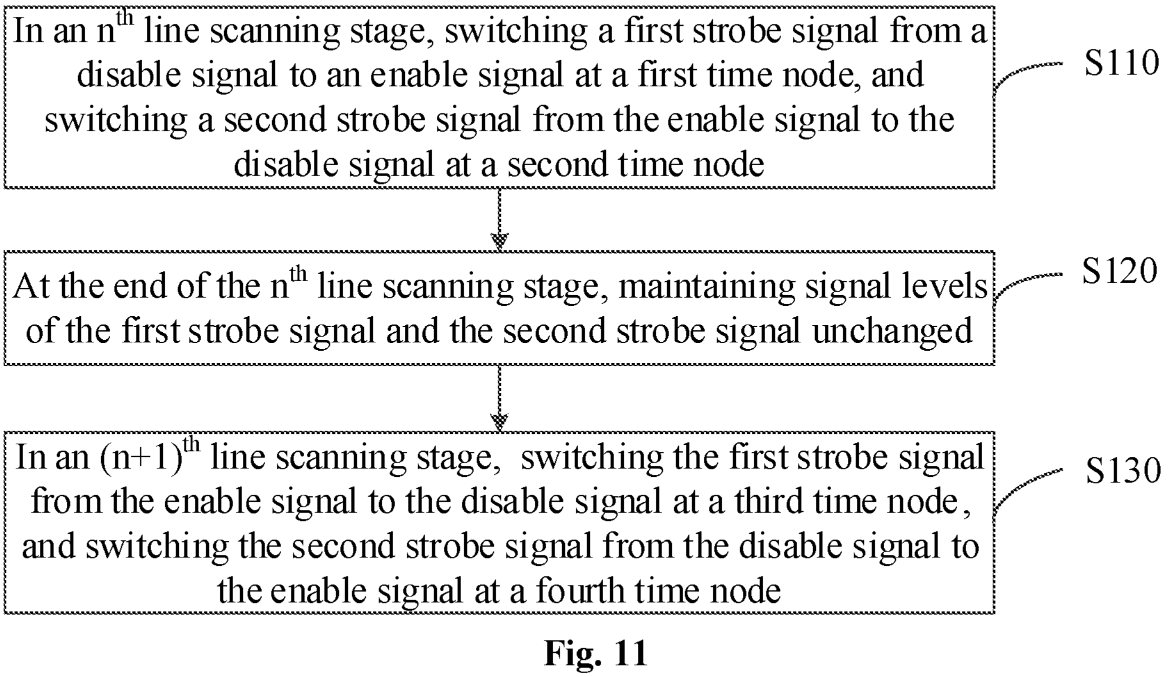
FIG. 11 is a schematic flow chart showing a display panel driving method provided by an embodiment of the present application.

An embodiment of the present application provides a display panel driving method. FIG. 11 shows a schematic flow chart of the display panel driving method provided by the embodiment of the present application. The display panel driving method is applicable to a display panel including a plurality of light-emitting pixels, at least one demultiplexing circuit, a first strobe signal line and a second strobe signal line.

The plurality of light-emitting pixels are arranged in an array. The demultiplexing circuit includes an input end and two output ends. The input end is connected to a data signal fan-out line, and the two output ends are respectively connected to two data signal lines. The first strobe signal line is connected to a first control end of the demultiplexing circuit, and provides a first strobe signal for the first control end; and the second strobe signal line is connected to the second control end of the multiple strobe module and provides a second strobe signal to the second control end.

The display panel driving method includes following steps:

- S110, in an $n^{th}$ line scanning stage, switching the first strobe signal from a disable signal to an enable signal at a first time node, and switching the second strobe signal from the enable signal to the disable signal at a second time node;
- S120, at the end of the $n^{th}$ line scanning stage, maintaining signal levels of the first strobe signal and the second strobe signal unchanged;
- S130, in an $(n+1)^{th}$ line scanning stage, switching the first strobe signal from the enable signal to the disable signal at a third time node, and switching the second strobe signal from the disable signal to the enable signal at a fourth time node.

In the present embodiment, the demultiplexing circuit can be driven with the first strobe signal and second strobe signal to communicate data signals to two data signal lines respectively, by setting two strobe signal lines to respectively connect to the control end of the demultiplexing circuit, so that corresponding data signals can be received by corresponding light-emitting pixels on the two data signal lines in each line scanning stage. Both strobe signals undergo only an enable transition process or a disable transition process in each line scanning stage, so that the signal period of the strobe signals is increased to two line scanning stages. By increasing the signal period of the strobe signals and reducing the signal frequency of the strobe signals, the signal power of the strobe signals can be reduced, so that the driving power consumption of the demultiplexing circuit is reduced when the demultiplexing circuit is used to achieve time division multiplexing of data signals, and further the overall power consumption of the display panel when displaying is reduced.

In S110, the display panel may switch the first strobe signal from the disable signal to the enable signal at the first time node in the $n^{th}$ line scanning stage and switch the second strobe signal from the enable signal to the disable signal at the second time node.

The first strobe signal remains the enable signal between the first time node to an stage end node of the $n^{th}$ line scanning stage. During this time period, the first control end of the demultiplexing circuit receives the enable signal, and connects the input end to the first output end, so that the data signal line connected to the first output end can receive the data signal output by the data signal fan-out line.

Similarly, the second strobe signal remains the enable signal between a stage start node and the second time node of the $n^{th}$ line scanning stage. During this time period, the second control end of the demultiplexing circuit receives the enable signal, and connects the input end to the second output end, so that the data signal line connected to the second output end can receive the data signal output by the data signal fan-out line.

In the $n^{th}$ line scanning stage, the two data signal lines connected to the demultiplexing circuit may respectively receive the data signals output from the data signal fan-out line in different time periods. The two data signal lines can receive data signals of different signal voltages, by adjusting the signal voltages of the data signals provided by the data signal fan-out line in the $n^{th}$ line scanning stage, so that separate control of light emitting of light-emitting pixels on the two data signal lines can be achieved.

In S120, at the end of the $n^{th}$ line scanning stage, the signal levels of the first strobe signal and the second strobe signal may remain unchanged. That is, in the $n^{th}$ line scanning stage, the first strobe signal undergoes only a single signal transition, and the second 20) strobe signal also undergoes only a single signal transition.

In S130, similarly as in the $n^{th}$ line scanning stage, the display panel may switch the first strobe signal from the enable signal to the disable signal at a third time node in the $(n+1)^{th}$ line scanning stage, and switch the second strobe signal from the disable signal to the enable signal at a fourth time node in the $(n+1)^{th}$ line scanning stage.

The first strobe signal remains the enable signal between an stage start node to the third time node the $(n+1)^{th}$ line scanning stage. During this time period, the first control end of the demultiplexing circuit receives the enable signal, and connects the input end to the first output end, so that the data signal line connected to the first output end can receive the data signal output by the data signal fan-out line.

Similarly, the second strobe signal remains the enable signal between the fourth time node to an stage end node of the $(n+1)^{th}$ line scanning stage. During this time period, the second control end of the demultiplexing circuit receives the enable signal, and connects the input end to the second output end, so that the data signal line connected to the second output end can receive the data signal output by the data signal fan-out line.

In the $(n+1)^{th}$ line scanning stage, the two data signal lines connected to the demultiplexing circuit may respectively receive the data signal output from the data signal fan-out line in different time periods. The two data signal lines can receive data signals of different signal voltages, by adjusting the signal voltages of the data signals provided by the data signal fan-out line in the $(n+1)^{th}$ line scanning stage, so that separate control of light emitting of light-emitting pixels on the two data signal lines can be achieved.

In each line scanning stage, by controlling the data signal fan-out line to adjust the output data signals, different data signals can be provided for the two data signal lines, thereby realizing time division multiplexing of the data signals and saving the number of data signal fan-out lines.

The above-mentioned $n^{th}$ line scanning stage and $(n+1)^{th}$ line scanning stage are taken as examples. The first strobe signal undergoes an enable transition in the $n^{th}$ line scanning stage and undergoes a disable transition in the $(n+1)^{th}$ line scanning stage. That is, the signal period of the first strobe signal is the duration of two line scanning stages.

It can be seen from the above-mentioned equation for calculation of power consumption of a strobe signal, that when the signal period of the strobe signal is increased and the signal frequency is decreased, the power consumption of the strobe signal can be decreased effectively. Therefore, in the embodiment, while the demultiplexing circuit is used to achieve time division multiplexing of data signals, the power consumption of the strobe signal(s) for driving the demultiplexing circuit can be reduced, and thereby the overall power consumption of the display panel can be reduced.

Figure 12:
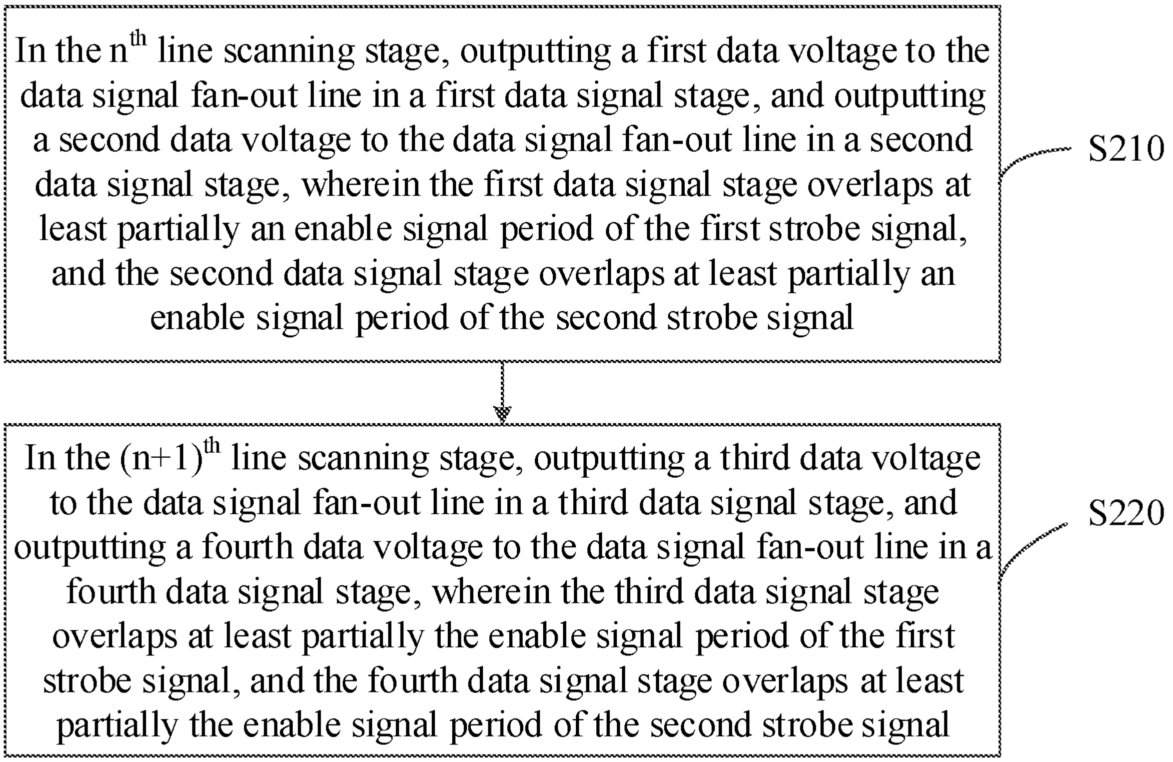
FIG. 12 is a schematic flow diagram showing a part of a display panel driving method provided by another embodiment of the present application.

As an alternative embodiment, as shown in FIG. 12, the above-mentioned display panel driving method may further include:

- S210, in the $n^{th}$ line scanning stage, outputting a first data voltage to the data signal fan-out line in a first data signal stage, and outputting a second data voltage to the data signal fan-out line in a second data signal stage, wherein the first data signal stage overlaps at least partially an enable signal period of the first strobe signal, and the second data signal stage overlaps at least partially an enable signal period of the second strobe signal; and

S220, in the (n+1)$^{th}$ line scanning stage, outputting a third data voltage to the data signal fan-out line in a third data signal stage, and outputting a fourth data voltage to the data signal fan-out line in a fourth data signal stage, wherein the third data signal stage overlaps at least partially the enable signal period of the first strobe signal, and the fourth data signal stage overlaps at least partially the enable signal period of the second strobe signal.

In this embodiment, in a single line scanning stage, different data voltages may be output in each of these two data signal stages, to two data signal lines, respectively, to realize separate control of light emitting of two light-emitting pixels. A data signal stage of an output data voltage should partially overlaps an enable signal period of a corresponding strobe signal, so that in the overlapping time period, the demultiplexing circuit connects the data signal fan-out line to a corresponding data signal line, enabling the data signal line to receive the data voltage.

In S210, in the n$^{th}$ line scanning stage, the display panel may output the first data voltage through the data signal fan-out line in the first data signal stage and output the second data voltage in the second data signal stage. There is at least an overlapping time period between the first data signal stage and the enable signal period of the first strobe signal, and there is at least an overlapping time period between the second data signal stage and the enable signal period of the second strobe signal.

In the first data signal stage, in order to enable the data signal line to which the first output end of the demultiplexing circuit is connected to receive the first data voltage, it is necessary to connect the input end of the demultiplexing circuit to the first output end during a part of the time period of the first data signal stage. That is, there should be at least an overlapping time period between the first data signal stage and the enable signal period of the first strobe signal. In the overlapping time period, the input end of the demultiplexing circuit is connected to the first output end, and the first data voltage on the data signal fan-out line is output to the data signal line connected to the first output end of the demultiplexing circuit.

In the second data signal stage, in order to enable the data signal line to which the second output end of the demultiplexing circuit is connected to receive the second data voltage, it is necessary to connect the input end of the demultiplexing circuit to the second output end during a part of the time period of the second data signal stage. That is, there should be at least an overlapping time period between the second data signal stage and the enable signal period of the second strobe signal. In the overlapping time period, the input end of the demultiplexing circuit is connected to the second output end, and the second data voltage on the data signal fan-out line is output to the data signal line connected to the second output end of the demultiplexing circuit.

In S220, in the (n+1)$^{th}$ line scanning stage, the display panel may output the third data voltage through the data signal fan-out line in the third data signal stage, and output the fourth data voltage in the fourth data signal stage. There is at least an overlapping time period between the third data signal stage and the enable signal period of the first strobe signal, and there is at least an overlapping time period between the fourth data signal stage and the enable signal period of the second strobe signal.

In the overlapping time period of the third data signal stage and the enable signal period of the first strobe signal, the third data voltage on the data signal fan-out line is output to the data signal line to which the first output end of the demultiplexing circuit is connected.

In the overlapping time period of the fourth data signal stage and the enable signal period of the second strobe signal, the fourth data voltage on the data signal fan-out line is output to the data signal line to which the second output end of the demultiplexing circuit is connected.

Figure 13:
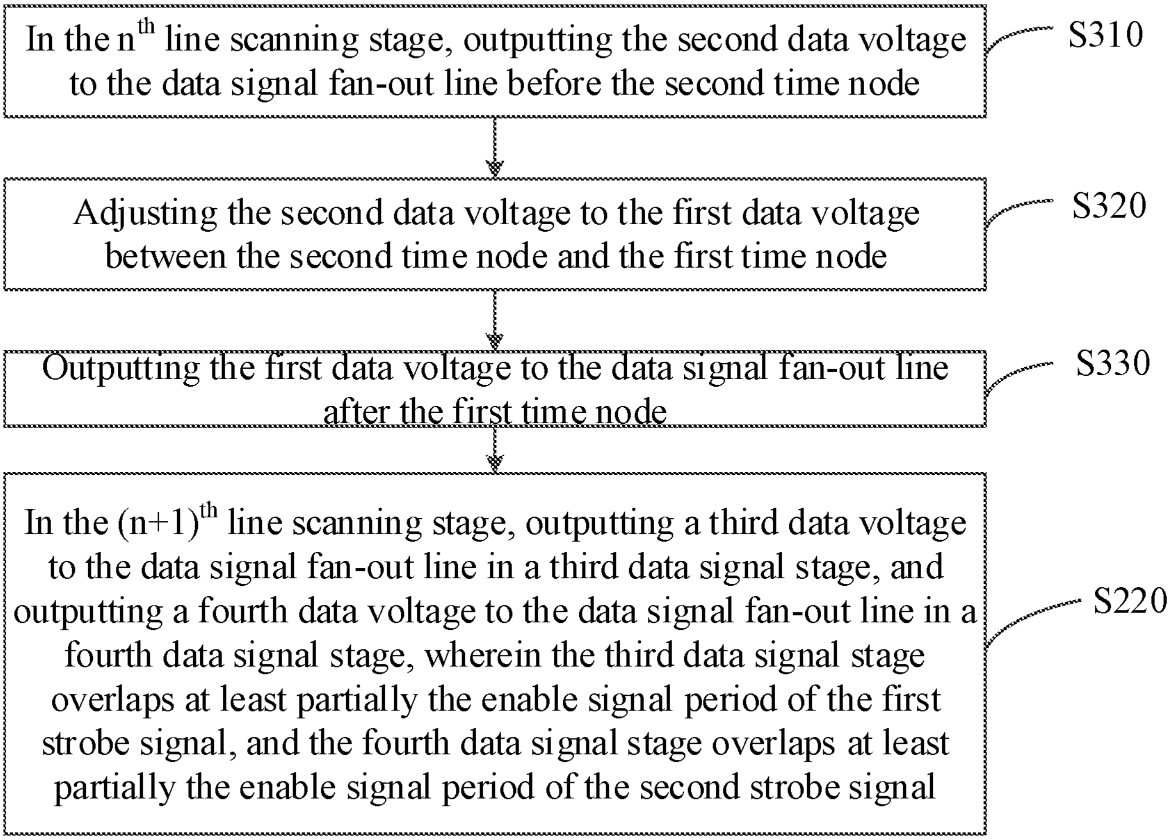
FIG. 13 is a schematic flow diagram showing a part of a display panel driving method provided by another embodiment of the present application.

As an alternative embodiment, as shown in FIG. 13, the above-mentioned S210 may include:

S310, in the n$^{th}$ line scanning stage, outputting the second data voltage to the data signal fan-out line before the second time node;

S320, adjusting the second data voltage to the first data voltage between the second time node and the first time node; and S330, outputting the first data voltage to the data signal fan-out line after the first time node.

In this embodiment, in a single line scanning stage, when the data voltage is adjusted, a time node for the adjustment may be set between the time nodes at which the two strobe signals transition respectively. In the time interval, a previous strobe signal has transitioned to the disable signal, and a latter strobe signal has not transitioned to the enable signal. At this moment, both the strobe signals are disable signals, and the output end is disconnected from the input end of the demultiplexing circuit. At this moment, adjustment of the amplitude of the data voltage would not affect data signals on the two data signal lines.

In S310, the display panel may output the second data voltage through the data signal fan-out line between the stage start node and the second time node of the n$^{th}$ line scanning stage. Since the second strobe signal is the enable signal between the stage start node and the second time node, the demultiplexing circuit may connect the second data signal line with the data signal fan-out line, and then the second data signal line may receive the second data voltage.

In S320, between the second time node and the first time node, the first strobe signal and the second strobe signal are both disable signals, and then both output ends of the demultiplexing circuit are disconnected from the input end. In this time interval, when the data voltage on the data signal fan-out line is adjusted from the second data voltage to the first data voltage, the two data signal lines are not affected.

In S330, the display panel may output the first data voltage through the data signal fan-out line between the first time node and the stage end node of the n$^{th}$ line scanning stage. Since the first strobe signal is the enable signal between the first time node and the stage end node, the demultiplexing circuit may connect the first data signal line to the data signal fan-out line, and then the first data signal line may receive the first data voltage.

As an alternative embodiment, similarly to that the data signal fan-out line is adjusted from the second data voltage to the first data voltage in the n$^{th}$ line scanning stage as mentioned above, in the (n+1)$^{th}$ line scanning stage, the display panel may output the third data voltage through the data signal fan-out line between the stage start node and the third time node, adjust the output third data voltage to the fourth data voltage between the third time node and the fourth time node, and output the fourth data voltage via the data signal fan-out line between the fourth time node and the stage end node.

Figure 14:
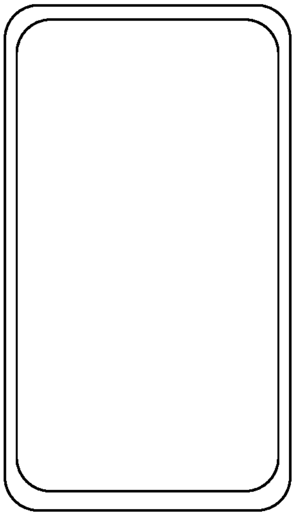
FIG. 14 is a schematic structure diagram of a display apparatus provided by an embodiment of the present application.

An embodiment of the present application provides a display apparatus. As shown in FIG. 14, the display apparatus may be a PC, a television, a display, a mobile terminal, a tablet computer, and a wearable device, etc. The display apparatus may include the display panel provided by the embodiment of the present application.

Function blocks shown in the structural block diagrams described above may be implemented in hardware, software, firmware, or a combination thereof. When implemented in hardware, the function blocks may be, for example, electronic circuits, application specific integrated circuits (ASICs), appropriate firmware, plug-ins, function cards, etc. When implemented in software, the elements of the present application may be programs or code segments to perform the required tasks. The programs or code segments may be stored in a machine-readable medium or transmitted over a transmission medium or communication link via a data signal carried in a carrier wave. A "machine-readable medium" may include any medium that can store or transmit information. An examples of the machine-readable medium may include an electronic circuit, a semiconductor memory device, a ROM, a flash memory, an erasable ROM (EROM), a floppy diskette, a CD-ROM, an optical disk, a hard disk, an optical fiber medium, a radio frequency (RF) link, etc. The code segments may be downloaded via a computer network such as the Internet, an intranet, etc.

It should be noted that, in this document, the terms "including", "comprising", or any other variation thereof, are intended to cover a non-exclusive inclusion, so that a process, method, article, or apparatus that includes a list of elements includes not only those elements but also other elements not expressly listed or inherent to such process, method, article, or apparatus.

While the principles and embodiments of the present application have been described herein using specific examples, the foregoing description of the instances has been presented only to aid in understanding the methodology and core concept of the present application. The above description includes merely preferred embodiments of the present application, and it should be noted that due to the limited nature of wording, there are objectively unlimited specific structures; for a person of ordinary skills in the art, several improvements, refinements or variations can be made without departing from the principle of the present application, and the above-mentioned technical features can be combined in an appropriate manner. Such modifications, refinements, variations or combinations, or any direct application of the concept or technical solution of the present application to another situation without a modification are intended to be covered by the protection scope of the present application.

What is claimed is:

1. A display panel, comprising:

a plurality of light-emitting pixels arranged in an array;

at least one demultiplexing circuit, for each of the at least one demultiplexing circuit, an input end being connected to a data signal fan-out line, and two output ends being respectively connected to two data signal lines;

a first strobe signal line for providing a first strobe signal and a second strobe signal line for providing a second strobe signal; and at least one data signal fan-out line, each of the at least one data signal fan-out line electrically connected to an input end of a corresponding one of the at least one demultiplexing circuit;

wherein in an $n^{th}$ line scanning stage, the first strobe signal is switched from a disable signal to an enable signal at a first time node, and the second strobe signal is switched from the enable signal to the disable signal at a second time node;

in the $n^{th}$ line scanning stage, each of the at least one data signal fan-out line outputs a first data voltage in a first data signal stage, and outputs a second data voltage in a second data signal stage; and the first data signal stage overlaps partially an enable signal period of the first strobe signal, and the second data signal stage overlaps partially an enable signal period of the second strobe signal;

at the end of the $n^{th}$ line scanning stage, the first strobe signal and the second strobe signal remain unchanged;

in an $(n+1)^{th}$ line scanning stage, the first strobe signal is switched from the enable signal to the disable signal at a third time node, and the second strobe signal is switched from the disable signal to the enable signal at a fourth time node;

in the $(n+1)^{th}$ line scanning stage, each of the at least one data signal fan-out line outputs a third data voltage in a third data signal stage, and outputs a fourth data voltage in a fourth data signal stage; and the third data signal stage overlaps partially the enable signal period of the first strobe signal, and the fourth data signal stage overlaps partially the enable signal period of the second strobe signal;

an overlapping time period between the first data signal stage and the enable signal period of the first strobe signal is greater than that between the third data signal stage and the enable signal period of the first strobe signal; and a first control end and a second control end of each of the least one demultiplexing circuit are connected to the first strobe signal line and the second strobe signal line respectively.

2. The display panel according to claim 1, wherein the first time node does not coincide with the second time node, and the third time node does not coincide with the fourth time node.

3. The display panel according to claim 2, wherein the second time node is before the first time node; and the third time node is before the fourth time node.

4. The display panel according to claim 1, wherein in the $n^{th}$ line scanning stage, each of the at least one data signal fan-out line adjusts the second data voltage to the first data voltage between the second time node and the first time node; and in the $(n+1)^{th}$ line scanning stage, each of the at least one data signal fan-out line adjusts the third data voltage to the fourth data voltage between the third time node and the fourth time node.

5. The display panel according to claim 4, wherein the display panel further comprises:

a plurality of scanning signal lines; and in the $n^{th}$ line scanning stage, a scanning signal line of the plurality of scanning signal lines corresponding to the $n^{th}$ line scanning stage outputs an enable signal of a scanning signal during a first scanning period; and a starting time node of the first scanning period is after the first time node; and in the $(n+1)^{th}$ line scanning stage, a scanning signal line of the plurality of scanning signal lines corresponding to the $(n+1)^{th}$ line scanning stage outputs an enable signal of a scanning signal during a second scanning period;

and a starting time node of the second scanning period is after the fourth time node.

6. The display panel according to claim 1, wherein the plurality of light-emitting pixels comprise a first light-emitting pixel, a second light-emitting pixel and a third light-emitting pixel emitting lights of different colors; and in at least one column of light-emitting pixels of two columns of light-emitting pixels corresponding to each of the at least one demultiplexing circuit, two adjacent light-emitting pixels emit lights of different colors.

7. The display panel according to claim 6, wherein the two data signal lines connected to each of the at least one demultiplexing circuit are a first data signal line and a second data signal line; and a column of light-emitting pixels connected to the first data signal line comprises a first light-emitting pixel and a second light-emitting pixel, and a column of light-emitting pixels connected to the second data signal line comprises a third light-emitting pixel.

8. The display panel according to claim 6, wherein the two data signal lines connected to each of the at least one demultiplexing circuit are a first data signal line and a second data signal line; and a column of light-emitting pixels connected to the first data signal line comprises a first light-emitting pixel and a third light-emitting pixel, and a column of light-emitting pixels connected to the second data signal line comprises a second light-emitting pixel and the third light-emitting pixel.

9. The display panel according to claim 8, wherein the first light-emitting pixel emits red light, the second light-emitting pixel emits blue light, and the third light-emitting pixel emits green light.

10. The display panel according to claim 1, wherein the display panel comprises a display area and a non-display area, the display area comprises the plurality of light-emitting pixels, and the non-display area comprises the at least one demultiplexing circuit.

11. A display panel driving method, applicable to a display panel comprising:

a plurality of light-emitting pixels arranged in an array;

at least one demultiplexing circuit, for each of the at least one demultiplexing circuit, an input end being connected to a data signal fan-out line, and two output ends being respectively connected to two data signal lines;

a first strobe signal line for providing a first strobe signal and a second strobe signal line for providing a second strobe signal; and at least one data signal fan-out line, each of the at least one data signal fan-out line electrically connected to an input end of a corresponding one of the at least one demultiplexing circuit, wherein a first control end and a second control end of each of the least one demultiplexing circuit are connected to the first strobe signal line and the second strobe signal line respectively; and the method comprising:

in an $n^{th}$ line scanning stage, switching the first strobe signal from a disable signal to an enable signal at a first time node, and switching the second strobe signal from the enable signal to the disable signal at a second time node;

at the end of the $n^{th}$ line scanning stage, maintaining signal levels of the first strobe signal and the second strobe signal unchanged; and in an $(n+1)^{th}$ line scanning stage, switching the first strobe signal from the enable signal to the disable signal at a third time node, and switching the second strobe signal from the disable signal to the enable signal at a fourth time node, wherein in the $n^{th}$ line scanning stage, each of the at least one data signal fan-out line outputs a first data voltage in a first data signal stage, and outputs a second data voltage in a second data signal stage; and the first data signal stage overlaps partially an enable signal period of the first strobe signal, and the second data signal stage overlaps partially an enable signal period of the second strobe signal;

in the $(n+1)^{th}$ line scanning stage, each of the at least one data signal fan-out line outputs a third data voltage in a third data signal stage, and outputs a fourth data voltage in a fourth data signal stage; and the third data signal stage overlaps partially the enable signal period of the first strobe signal, and the fourth data signal stage overlaps partially the enable signal period of the second strobe signal; and an overlapping time period between the first data signal stage and the enable signal period of the first strobe signal is greater than that between the third data signal stage and the enable signal period of the first strobe signal.

12. The display panel driving method according to claim 11, wherein outputting the first data voltage to the data signal fan-out line in the first data signal stage, and outputting the second data voltage to the data signal fan-out line in the second data signal stage comprises:

outputting the second data voltage to the data signal fan-out line before the second time node;

adjusting the second data voltage to the first data voltage between the second time node and the first time node; and outputting the first data voltage to the data signal fan-out line after the first time node.

13. A display apparatus comprising a display panel, wherein the display panel comprises:

a plurality of light-emitting pixels arranged in an array;

at least one demultiplexing circuit, for each of the at least one demultiplexing circuit, an input end being connected to a data signal fan-out line, and two output ends being respectively connected to two data signal lines;

a first strobe signal line for providing a first strobe signal and a second strobe signal line for providing a second strobe signal; and at least one data signal fan-out line, each of the at least one data signal fan-out line electrically connected to an input end of a corresponding one of the at least one demultiplexing circuit, wherein in an $n^{th}$ line scanning stage, the first strobe signal is switched from a disable signal to an enable signal at a first time node, and the second strobe signal is switched from the enable signal to the disable signal at a second time node;

in the $n^{th}$ line scanning stage, each of the at least one data signal fan-out line outputs a first data voltage in a first data signal stage, and outputs a second data voltage in a second data signal stage; and the first data signal stage overlaps partially an enable signal period of the first strobe signal, and the second data signal stage overlaps partially an enable signal period of the second strobe signal;

at the end of the $n^{th}$ line scanning stage, the first strobe signal and the second strobe signal remain unchanged;

in an $(n+1)^{th}$ line scanning stage, the first strobe signal is switched from the enable signal to the disable signal at a third time node, and the second strobe signal is switched from the disable signal to the enable signal at a fourth time node;

in the $(n+1)^{th}$ line scanning stage, each of the at least one data signal fan-out line outputs a third data voltage in a third data signal stage, and outputs a fourth data voltage in a fourth data signal stage; and the third data signal stage overlaps partially the enable signal period of the first strobe signal, and the fourth data signal stage overlaps partially the enable signal period of the second strobe signal;

an overlapping time period between the first data signal stage and the enable signal period of the first strobe signal is greater than that between the third data signal stage and the enable signal period of the first strobe signal; and a first control end and a second control end of each of the least one demultiplexing circuit are connected to the first strobe signal line and the second strobe signal line respectively.

14. The display apparatus according to claim 13, wherein the first time node does not coincide with the second time node, and the third time node does not coincide with the fourth time node.

15. The display apparatus according to claim 14, wherein the second time node is before the first time node; and the third time node is before the fourth time node.

16. The display apparatus according to claim 13, wherein in the $n^{th}$ line scanning stage, each of the at least one data signal fan-out line adjusts the second data voltage to the first data voltage between the second time node and the first time node; and in the $(n+1)^{th}$ line scanning stage, each of the at least one data signal fan-out line adjusts the third data voltage to the fourth data voltage between the third time node and the fourth time node.

17. The display apparatus according to claim 16, wherein the display panel further comprises:

a plurality of scanning signal lines; and in the $n^{th}$ line scanning stage, a scanning signal line of the plurality of scanning signal lines corresponding to the $n^{th}$ line scanning stage outputs an enable signal of a scanning signal during a first scanning interval; and a starting time node of the first scanning interval is after the first time node; and in the $(n+1)^{th}$ line scanning stage, a scanning signal line of the plurality of scanning signal lines corresponding to the $(n+1)^{th}$ line scanning stage outputs an enable signal of a scanning signal during a second scanning interval; and a starting time node of the second scanning interval is after the fourth time node.

* * * * *